Oct. 9, 1934.  J. E. FOSTER  1,976,391
THERMIONIC SYSTEM
Original Filed Jan. 8, 1925
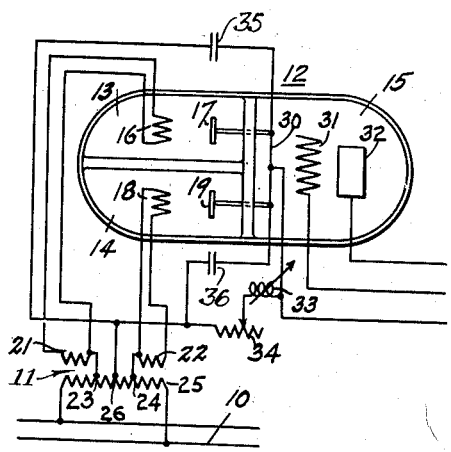
INVENTOR
Julius E. Foster
by George E. Mueller
ATTY.

Patented Oct. 9, 1934

1,976,391

UNITED STATES PATENT OFFICE 1,976,391

THERMIONIC SYSTEM

Julius E. Foster, Pittsburgh, Pa., assignor to Radio Corporation of America, a corporation of Delaware Original application January 8, 1925, Serial No. 1,182. Patent No. 1,864,591, dated June 28, 1932. Divided and this application June 5, 1929, Serial No. 368,685

12 Claims. (Cl. 250—27)

This invention relates in general to electronic devices and to systems whereby such devices may be utilized to rectify alternating currents, for general application, but particularly for radio applications where a uniform or constant current is desired.

The primary object of my invention is to provide a rectifying system and an electronic device that may be suitably energized therefrom, by energy derived from a source of alternating current such as the usual light and power circuit generally available.

Another object of my invention is to provide an improved system for obtaining rectified current of substantially uniform or constant values that may be suitable for application in radio circuits.

In the parent application, Ser. No. 1,182, filed January 8, 1925, which has matured into Patent No. 1,864,591 and of which this is a division, I have described an electronic device embodying a rectifying unit of special construction whereby proper and complete rectification of an alternating current may be effected, to provide a source of substantially constant direct current or direct current energy for the energization of a cathode element in a 3-element tube.

The feature of importance that is involved in the construction of that rectifier unit is that the filamentary electrodes of a double-wave rectifier must be properly arranged and separated, or isolated, to prevent current leakage between the active zones around those filaments, if proper rectification of the alternating current is to be obtained, and short circuiting of the associated transformer is to be avoided.

Insofar as the teaching of the parent application in that direction may be applicable to the inventions disclosed herein, it is desired that such teaching be considered as a part of the present application.

The nature of the operation of a radio receiving set, is such that small variations in energizing current, or applied energy, are considerably magnified. It is therefore desirable that the rectifying system, whereby the usual available alternating-current energy is rectified to direct-current energy, shall be such as to reduce to a minimum the variation or ripple in the resultant rectified direct current, which usually manifests its presence by the well known hum. If such resultant energy can be maintained substantially constant, any distortion that might be introduced into the receiving circuit will be considerably minimized.

In the usual rectifying circuits or systems, the positive and negative waves of an alternating current are caused to assume the same cumulative relationship whereby all of the current waves are caused to traverse a predetermined load circuit in the same direction, thereby establishing the effect of a direct current. Because of the spaced relationship and the sinusoidal character of the energy effects of the waves, however, even when both waves are rectified, the resultant current presents a varying direct current effect similar to the super-imposition of an alternating current upon a constant uniform direct current.

It is one of the objects of this invention to provide rectifying systems wherein the varying effect in the resultant current is considerably diminished.

Rectification of alternating current is usually effected by transmitting all of the waves of one polarity in succession thru a uni-directional current conducting medium. Due to their electrical spacing such waves substantially constitute successive spaced energy impulses. Between such energy impulses of that polarity, no energy is ordinarily transmitted by the individual current conducting medium. When the waves of both polarities, are rectified, the waves of the other polarity are also transmitted through a uni-directional current-conducting medium and combined with the waves of the first polarity in a cumulative sense. Since the energy impulses are alternately transmitted, by the two conducting mediums, however, and then combined in a single conducting medium, which is the load circuit, the space intervals between the energy impulses of one polarity are filled to a great extent by the energy impulses of the other polarity.

In order to provide a better rectification characteristic however, I modify the operation of each uni-directional current conducting medium in such manner as to supplement the energy impulses normally transmitted by it. During the transmission of the normal impulse through the conducting medium, an auxiliary energy impulse is stored in an auxiliary circuit. During the normally inactive intervals between the normal energy impulses, the stored energy impulses are supplied to the load circuit. Since the normal energy impulses are transmitted by the two conducting media or paths alternately, the accumulation of the normal and auxiliary energy impulses in the load circuit tends to establish a substantially constant direct current effect.

The result of the ultimate rectified current made up of the two substantially constant current impulses transmitted by each path is relatively free of variations and less likely to produce a humming effect.

In one modification of this invention I establish the storage of energy, during the normal transmission of a current energy impulse through one conducting medium, by means of a condenser connected in shunt relation to the conducting medium. The terminals of the conducting medium normally are the anode and the cathode of a rectifying device. While current is normally transmitted between the cathode and the anode, energy is stored in the condenser. When the circuit polarity is such that current does not normally traverse the path between the cathode and the anode, the condenser discharges its stored energy into the load circuit to supplement the energy impulse already transmitted by the rectifier. The condenser thus transmits energy during the normally inactive periods of the rectifying medium. Since the two rectifying paths, that are ordinarily utilized to transmit the respective current waves of each polarity, are similarly provided with auxiliary energy storage circuits, the combination of the transmitted normal impulses and the stored impulses provides a substantially constant uniform direct current in the load circuit.

In another modification of this invention described and claimed in another divisional application, which has matured into Patent No. 1,878,124, I utilize a plurality of filaments with each rectifying path, and connect a phase splitter between the energizing circuit and the respective filaments of each rectifying path, whereby each path will transmit a plurality of overlapping wave impulses to provide a substantially constant current transmission thru that rectifying path. When each of both usual rectifying paths is so provided with a phase splitter, which also serves as an energy storage system, the combined transmitted currents constitute a substantially constant direct current available for the receiving circuit.

The accompanying drawing illustrates the modification in which the condensers are utilized as the energy-storage means associated with the rectifying paths.

As is illustrated in the drawing, alternating current energy is derived from a circuit 10, such as the usual light and power circuit, and is transformed to the desired voltage by means of a transformer 11, after which it is rectified for use with a device illustrated herein as a combination electronic device 12 divided into a rectifying unit embodying two rectifying chambers 13 and 14 respectively and an amplifying unit 15. The rectifying unit 13 is provided with a filament or cathode 16 and a plate or anode 17. The rectifying unit 14 similarly comprises a filament 18 and a plate 19. The filaments 16 and 18 are respectively energized through the transformer 11 by two secondary windings 21 and 22. One terminal of each secondary winding is connected to points 23 and 24 on the primary winding 25 spaced from a mid-point 26 which serves as an artificial neutral point for the rectifying system.

The amplifying chamber 15 contains a filament 30, a grid 31 and a plate 32. The filament 30 is connected electrically between two conductors connected to the plates 17 and 19, respectively, in the rectifying units. The mid-point of the filament 30 is connected to the artificial neutral point 26 of the transformer thru a reactor 33 and a variable resistor 34.

Between the neutral point 26 and the respective terminals of the filament 30, which also substantially constitute the terminals of the anodes 17 and 19 in the rectifying units, are connected two condensers 35 and 36, respectively.

The connections of the transformer 11 and the rectifying units are such that the rectifying units will be alternately effective to transmit current. Each compartment will transmit only the current waves of one polarity. While the rectifying unit 13 is transmitting its current wave or energy impulse, energy is stored in the condenser 35. When the polarity of the circuit conductors of the circuit 10 changes, the conducting path between the electrode 16 and the plate 17 transmits no energy to the filament 30 from the transformer. At the same time the change of polarity permits the energy stored in the condenser 35 to be supplied to the filament. The filament 30 thus receives the normal current impulse transmitted by the rectifying unit 13 at definite intervals corresponding to the frequency of the energizing circuit 10, and, in between such intervals, receives the energy stored in the condenser 35.

The rectifying unit 14 and its associated condenser 36 function similarly, so that the filament 30 is supplied with a substantially constant current made up of the combination of energy impulses transmitted by the rectifiers and the condensers. By reason of the periodic reversal of polarity of the energizing circuit, the condensers are alternately and periodically charged and discharged. The reactor 33 is disposed in the common circuit and serves as a stabilizer to diminish current fluctuation.

The condensers 35 and 36 and the filament 30 of the amplifying unit thus constitute oscillating circuits that are periodically energized to supply substantially constant current to the filament 30, or load circuit.

My invention is not limited to the specific details of construction nor to the circuit connections that are illustrated, but may be variously modified without departing from the spirit and scope of the invention as set forth in the appended claims.

I claim as my invention:

1. In combination, a source of alternating current, an audion provided with a filamentary cathode, a grid and a plate, and means for segregating the energy waves of opposite polarities and supplying all energy to the filamentary cathode as unidirectional energy, and energy-storing means connected in parallel relation to said segregating means for supplying energy to the cathode during the intervals when the segregating means are inactive.

2. The method of energizing a filamentary electrode of a vacuum tube from a source of alternating current, which consists in separately rectifying each half wave of the alternating current and then supplying each separately rectified wave to a different portion of the filamentary electrode.

3. In combination, an audion having a filamentary cathode and means for controlling its energization, comprising a source of energy having a neutral point, two rectifiers energized from said source and each having an anode connected to a terminal of the cathode, means connecting the mid-point of the cathode to the neutral point of the source, and a condenser connected between each end of the cathode and the said neutral point.

4. In combination, an audion comprising an electron-emitting filamentary electrode, and means for alternately energizing half portions of said electrode with direct current impulses derived from an alternating current source.

5. In combination, an audion comprising a pair of electron-emitting filamentary electrodes, and means for alternately energizing said electrodes with direct current impulses derived from an alternating current source.

6. In combination, an electron discharge device comprising a filamentary cathode, grid and plate electrodes, and means for energizing said cathode with rectified alternating current, comprising a source of alternating current, a pair of half-wave rectifiers energized from said source and each having included in its uni-directional current-conducting path one-half of the cathode.

7. In combination, an electron discharge device comprising cathode, grid and plate electrodes, and means for energizing said cathode with rectified alternating current, comprising a source of alternating current, a pair of half-wave rectifiers alternately energized from said source and each having included in its uni-directional current-conducting path one-half of the cathode, and energy storing means connected between each end of the cathode and a low potential point common to both current conducting paths whereby the energy stored during the conducting periods will be discharged through its associated cathode portion during the non-conducting periods.

8. The combination with a radio tube having a filament, of two rectifiers mounted on the tube and connected with opposite ends of the filament, one rectifier being in series with one end of the filament and one being in series with the other end of the filament, and a terminal connected with the filament intermediate its ends.

9. The combination with a radio tube having a filament, of a pair of hot cathode rectifiers mounted on the tube and connected with opposite ends of the filament, one rectifier being in series with one end of the filament and one being in series with the other end of the filament, and a terminal connected with the filament intermediate its ends.

10. The combination with a radio tube having a filament, of rectifiers mounted on the tube connected with opposite ends of the filament, an alternating current source having a neutral point for energizing said rectifiers and a resistance connected between an intermediate point of the filament and the neutral point of the alternating current source.

11. The combination with a radio tube having a filament, of rectifiers mounted on the tube connected with opposite ends of the filament, an alternating current source having a neutral point for energizing said rectifiers and an adjustable resistance connected between an intermediate point of the filament and the neutral point of the alternating current source.

12. The combination of a radio tube having a filament, of rectifiers mounted on the tube connected with opposite ends of the filament, an alternating current source having a neutral point for energizing said rectifiers and a conductor including a resistance and an inductance connected between an intermediate point of the filament and the neutral point of the alternating current source.

JULIUS E. FOSTER.